United States Patent [19]

Tokunaga et al.

[11] 4,415,713

[45] Nov. 15, 1983

[54] HIGH ACTIVITY SUPPORTED CATALYTIC COMPONENTS AND METHOD FOR HOMO- OR CO-POLYMERIZATION OF α-OLEFIN

[75] Inventors: Shoichi Tokunaga, Tokyo; Atsumi Kato, Hikari; Tatsuo Kimoto; Keikichi Baba, both of Shinnanyo, all of Japan

[73] Assignee: Toyo Stauffer Chemical Co., Ltd., Tokyo, Japan

[21] Appl. No.: 315,064

[22] Filed: Oct. 26, 1981

Related U.S. Application Data

[63] Continuation of Ser. No. 189,334, Sep. 22, 1980, abandoned, which is a continuation of Ser. No. 954,764, Oct. 26, 1978, abandoned.

[30] Foreign Application Priority Data

Nov. 4, 1977 [JP] Japan ................................ 52-132201

[51] Int. Cl.$^3$ ........................... C08F 4/02; C08F 10/06
[52] U.S. Cl. ................................. 526/125; 252/429 B; 526/97; 526/124; 526/351; 526/903; 526/904; 526/906; 502/150; 502/169
[58] Field of Search ........................ 526/97, 124, 125; 252/429 B

[56] References Cited

U.S. PATENT DOCUMENTS

| | | | |
|---|---|---|---|
| 4,093,789 | 6/1978 | Kuroda et al. | 526/125 |
| 4,107,412 | 8/1978 | Welch | 526/125 |
| 4,107,415 | 8/1978 | Giannini et al. | 526/125 |

FOREIGN PATENT DOCUMENTS

| | | | |
|---|---|---|---|
| 2600688 | 7/1976 | Fed. Rep. of Germany | 526/125 |
| 2644440 | 4/1977 | Fed. Rep. of Germany | 526/125 |

*Primary Examiner*—Edward J. Smith
*Attorney, Agent, or Firm*—Armstrong, Nikaido, Marmelstein & Kubovcik

[57] ABSTRACT

A high activity supported catalytic component obtained by pulverizing together (a) an anhydrous magnesium halide and (b) a titanium compound in the concomitant presence of 0.1 to 20 wt. % of (c) a liquid aromatic hydrocarbon and/or a liquid aromatic hydrocarbon halide, within the supported catalytic component, at temperature between 0° and 100° C. at which the liquid aromatic hydrocarbon and/or the liquid aromatic hydrocarbon halide remains in a liquid state throughout the whole range of temperature during the pulverization; and a method in which α-olefin is homo- or co-polymerized in the presence of a catalytic system comprising the high activity supported catalytic component, an organo-aluminum compound and an electron donor.

4 Claims, No Drawings

HIGH ACTIVITY SUPPORTED CATALYTIC COMPONENTS AND METHOD FOR HOMO- OR CO-POLYMERIZATION OF α-OLEFIN

This is a continuation of application Ser. No. 189,334, filed Sept. 12, 1980, now abandoned, which is a continuation of application Ser. No. 954,764, filed Oct. 26, 1978 also abandoned.

BACKGROUND OF THE INVENTION

This invention relates to a high activity supported catalytic component which is advantageously usable in the manufacture of highly crystalline α-olefin polymer and also to a method for homo- or co-polymerizing the α-olefin in the presence of the high activity supported catalytic component. More specifically stated, the high activity supported catalytic component is manufactured by including a liquid aromatic hydrocarbon and/or a liquid aromatic hydrocarbon halide as reforming agent in a catalytic component system consisting of a magnesium halide, a titanium compound and further an electron donor and, if required, further by using a halogen concentration diluent therewith; and in the method, the α-olefin is homo- or co-polymerized by using a catalytic system in which the high activity supported catalytic component is concomitant with an organoaluminum compound and an electron donor.

DESCRIPTION OF THE PRIOR ART

With regard to a catalytic component which is suitable for the manufacture of a crystalline polymer of α-olefin, it has been proposed as an advantageous method to use a catalyst system consisting of a γ- or δ-type titanium trichloride and an organoaluminum compound or a catalyst system consisting of an organoaluminum compound and an eutectic mixture of titanium chloride trichloride and aluminum chloride. In another method which has also been proposed as an advantageous method, a catalyst system comprising a supported catalytic component, triethyl aluminum and an oxy acid ester is used. Compared with catalyst systems of the former type, the latter type includes catalyst systems of excellent catalytic efficiency. The examples of methods for manufacturing the supported catalytic component for a catalyst system of the latter type include Japanese patent application laid-open No. 48-16986, laid-open No. 48-16988, laid-open No. 49-86482 and laid-open No. 50-45081. What have been disclosed by these Japanese patent applications can be summarized into a method wherein a supported catalytic component is manufactured by mixing an activated anhydrous magnesium chloride with an addition product obtained from a titanium tetrachloride and an ethyl benzoate and by bringing them into contact with each other by a mechanical pulverization means. According to these Japanese patent applications, with such a supported catalytic component used for polymerization of α-olefin, a high efficiency polymerization activity and highly crystalline polymer can be obtained. Although the catalytic component manufactured by the above stated method is a considerable improvement over conventionally employed catalytic components, with such a catalytic component used, there still remain a large quantity of the killed catalytic component in the polymer product obtained, because the polymerization activity is still insufficient even with the improved catalytic component employed. This, therefore, necessitates a deashing process for removal of the killed catalytic component from the polymer. In view of this, development of a supported catalytic component which further improves the conventional catalytic components has been desired. The inventors of the present invention strenuously conducted studies for development of a supported catalytic component that would meet the above stated requirement. As a result of the studies, we have discovered that an α-olefin polymer having increased activity and of a high crystallinity can be obtained by using an aromatic hydrocarbon and/or an aromatic hydrocarbon halide which remains in a liquid state over a whole temperature range during a process of pulverization together with a catalytic component system, including an anhydrous magnesium halide and a titanium compound, as reforming agent for the conventional supported catalytic component and further, if necessary, by allowing a halogen concentration diluent to be concomitant. This discovery has led to the present invention.

SUMMARY OF THE INVENTION

It is an object of the present invention to provide a high activity supported catalytic component which can be obtained from:

(1) A process in which (a) an anhydrous magnesium halide, (b) a titanium compound, particularly (e) a halogen containing di-, tri- or tetra-valent titanium compound (hereinafter will be called a halogen containing titanium compound), (c) a liquid aromatic hydrocarbon and/or a liquid aromatic hydrocarbon halide are pulverized together;

(2) a process in which (a) an anhydrous magnesium halide, (b) a titanium compound which is prepared by using (f) a halogen containing titanium compound in combination with an electron donor, (c) a liquid aromatic hydrocarbon and/or a liquid halogen containing aromatic hydrocarbon are pulverized together:

(3) a process in which (a) an anhydrous magnesium halide, (b) a titanium compound which is a complex consisting of (g) a halogen containing titanium compound and an electron donor, (c) a liquid aromatic hydrocarbon and/or a liquid halogen containing aromatic hydrocarbon are pulverized together: or (4) a process in which the above stated process (1), (2) or (3) is carried out by adding (d) a halogen concentration diluent which preferably consists of an inorganic compound and/or a solid organic compound.

It is another object of the invention to provide a method for homo- or co-polymerization of α-olefin which is carried out in the presence of the high activity supported catalytic component.

The prior art of manufacturing a supported catalytic component by pulverizing aromatic hydrocarbons together includes a Japanese patent application laid-open No. 49-86482 which discloses a method in which a solid aromatic hydrocarbon and other solid compounds are merely employed as supports for catalytic components and, judging from what is disclosed in the specification thereof, the aromatic hydrocarbon is not employed for the purpose of reforming the catalytic components. In accordance with the disclosed method, the aromatic hydrocarbon hardly contributes to the improvement in the catalytic efficiency.

In the method of the present invention, a supported catalytic component consisting of a magnesium halide and a titanium compound is reformed by means of a liquid aromatic hydrocarbon and/or a liquid halogen containing aromatic hydrocarbon and, if necessary, also with a halogen concentration diluent employed. It is a feature of the invention that the liquid aromatic hydrocarbon and/or the liquid aromatic hydrocarbon halide employed in accordance with this invention must remain in a liquid state over the whole range of temperature at which the co-pulverization process is carried out. The co-pulverization process is carried out at temperature between 0° and 100° C. and normally between a normal temperature and 80° C. Therefore, the liquid aromatic hydrocarbon and/or the liquid aromatic hydrocarbon halide must be selected out of hydrocarbons that remain in a liquid state at least within the above stated range of pulverization temperature. A salient effect is brought about on the polymerization activity with the liquid aromatic hydrocarbon and/or the liquid halogen containing hydrocarbon added in quantity 0.1 to 20 wt % within the supported catalytic component. Compared with the polymerization activity of supported catalytic components manufactured by the conventional methods, such as the one disclosed by the Japanese patent application laid-open No. 49-86482, the polymerization activity of the catalytic component obtained in accordance with the present invention is at least 140 to 150% of that of the conventional methods. This is a great advantage which has never been expected from the prior art and, in accordance with the present invention, the conventionally indispensable process of deashing is now dispensable for the polymer product obtained with such a catalytic component used.

The present invention will be more clearly understood from the following detailed description:

First, the materials to be employed in accordance with this invention and procedures for the preparation of them are as follows:

The anhydrous magnesium halide, which is referred to as component (a) herein, can be selected out of the group including an anhydrous magnesium chloride, an anhydrous magnesium bromide and an anhydrous magnesium iodide, of which the use of an activated anhydrous magnesium chloride is preferable. The activated anhydrous magnesium chloride can be prepared, for example, in the following manner: Using a polar organic solvent solution such as a methanol solution of an anhydrous magnesium halide, the anhydrous magnesium halide is separated by rapidly evaporating the solvent; or a magnesium halide which has been heated and dried at a temperature at least 100° C. is degased under a vacuum or reduced pressure. The magnesium halide is then put in a pulverizer such as a ball mill or a vibration mill the inside of which has been replaced beforehand with an inert gas. Pulverization is carried out with the pulverizer until the specific surface area of the magnesium halide reaches 3 m²/g.

The halogen containing titanium compound which is herein referred to as the compound (c) in the titanium compound which is herein referred to as the component (b) and the halogen containing titanium compound which contains the electron donor in the component (f) can be selected out of the group consisting of, for example, inorganic compounds such as titanium trichloride, titanium tetrachloride, etc: an eutectic mixture or a crystalline compound consisting of titanium trichloride and another metal halide; and organic halogen containing titanium compounds such as ethoxy trichloro titanium, tetrachloro titanium methyl acetate, isopropoxy titanium trichloride, dipropoxy dichloro titanium, diacetoxy dichloro titanium, triethoxy chloro titanium, tetra-2-chloro ethoxy titanium, diisobutoxy dichloro titanium, tripropoxy chloro titanium, dicyclopentadienyl dichloro titanium, dichloro pentadienyl iodo titanium, etc. The halogen containing titanium compound may be used alone or in combination of two or more than two kinds. The addition quantity of the halogen containing titanium compound as converted into titanium atoms is 0.5–10 parts by weight to 100 of the anhydrous magnesium halide, and preferably 1–7 parts by weight.

The liquid aromatic hydrocarbon which is herein referred to as the component (c) can be selected out of the group consisting of benzene, toluene, xylene, hemimellitene, pseudo cumene, mesitylene, prehnitene, isodurene, ethyl benzene, n-propyl benzene, cumene, n-butyl benzene, t-butyl benzene, p-cymene, 1,3,5-triethyl benzene, styrene, allyl benzene etc. As for the liquid aromatic hydrocarbon halide, selection thereof can be made out of the group consisting of fluoro benzene, chloro benzene, bromo benzene, iodo benzene, chloro toluene, bromo toluene, dichloro toluene, trichloro toluene, bromochloro benzene, bromoiodo benzene, chloroiodo benzene, etc. The liquid aromatic hydrocarbon and/or the liquid aromatic hydrocarbon halide may be either used alone or in combination of two or more than two kinds. The addition quantity of the liquid aromatic hydrocarbon and/or the liquid aromatic hydrocarbon halide is 0.1–20 parts by weight to 100 of the system comprising the magnesium halide, the halogen containing titanium compound and the electron donor and is preferably 1.0–13 parts by weight.

The halogen concentration diluent which is herein referred to as the component (d) is employed as carrier only for the purpose of diluting the halogen concentration in the catalytic components remaining in the polyolefin poduct obtained so that the deterioration of the polyolefin can be prevented thereby. The components of the halogen concentration diluent may be selected out of the group of inorganic compounds including boron oxide, titanium oxide, aluminum oxide, silicon oxide, calcium carbonate, calcium sulfate, sodium sulfate, calcium phosphate, barium carbonate, magnesium oxide and the group of organic compounds that remain in a solid state at normal temperature such as durene, naphthalene, anthracene, polypropylene and polyethylene. There is no particular limit to the addition quantity of the halogen concentration diluent. However, the preferable addition quantity of the halogen concentration diluent is 5–95 parts by weight to 100 of the catalytic components.

The electron donor which is herein referred to as the component (f) or (g) is such a matter that contains in its molecule at least one atom selected out of the atoms of nitrogen, sulfur, oxygen and phosphor. The electron donor thus can be selected out of the compounds, that have the functional groups of, for example, alcohol, aldehyde, organic acid, organic acid anhydride, ketone, ester, ether, amide, imide, lactone, lactam, thio ether, thio alcohol, nitrile, phosphoric acid amide, phosphine, phosphoric amide, phosphite, a urea derivative, etc. and, to be more specific, can be selected out of the group consisting of ethyl benzoate, ethyl p-anisate, tetramethyl urea, tetramethyl ethylene diamine, diethyl ether, triethyl amine, pyridine, nitro benzene, triphenyl phosphine, carbon disulfide, diphenyl ether, thiophenol hexamethyl phosphoric triamide, γ-butyro lactone, N,N-dimethyl acetoamide, anisole, N,N-dimethyl aniline, xylene, etc. Of these matters, the use of ethyl benzoate or ethyl p-anisate is preferable.

The electron donor may be used either alone or in combination of two or more than two kinds. The addition quantity of the electron donor is preferably 0.1-200 mol for 100 of the halogen containing titanium compound.

The complex consisting of the halogen containing titanium compound which is the component (g) as referred to herein and the electron donor is preferably selected out of the group including a titanium tetrachloride-ethyl benzoate complex, a titanium tetrachloride-nitro benzene complex, a titanium trichloride-tetramethylene diamine complex, a titanium tetrachloride-tetramethylene diamine complex, a titanium tetrachloride-methyl ethyl ketone complex, a titanium trichloride-ethyl benzoate complex, a titanium tetrachloride-diethyl ether complex, etc.

The complex may be used either alone or in combination of two or more than two kinds. The addition quantity of the complex, as converted into the atoms of titanium, is 0.5-15 parts by weight to 100 of the anhydrous magnesium halide and is preferably 1-10 parts by weight.

The complex, for example the titanium tetrachloride-ethyl benzoate complex, is prepared in the following manner: Using a container the inside of which has been replaced with nitrogen, 1000 parts by volume of n-hexane which has been degased and dehydrated and about 160 parts by volume of titanium tetrachloride are introduced into the container. Next, about 195 parts of ethyl benzoate are added little by little. After the addition of the ethyl benzoate, the inside temperature of the container is heated up to about 60° C. Then, while the temperature is kept at 60° C., stirring is continued for about one hour to complete reaction. Since a solid-like matter comes to precipitate as a reaction product, the reaction liquid changes into a slurry-like state. The reaction product is collected by filtration. A cake which is obtained in this manner is washed with n-hexane and dried under reduced pressure to obtain a titanium tetrachloride-ethyl benzoate complex, which is in a yellow crystalline state.

Next, the supported catalytic component of the present invention is prepared by pulverizing the above stated materials with a pulverizer such as a ball mill or a vibration mill in an inert gas atmosphere such as nitrogen, helium or argon. The preparation of the supported catalytic component can be carried out by one of the following processes:

(1) A process in which an anhydrous magnesium halide, a halogen containing titanium compound, a liquid aromatic hydrocarbon and/or a liquid aromatic hydrocarbon halide are mixed and co-pulverized.

(2) A process in which an anhydrous magnesium halide, a halogen containing titanium compound-electron donor complex, a liquid aromatic hydrocarbon and/or a liquid aromatic hydrocarbon halide are mixed and co-pulverized.

(3) A process in which an anhydrous magnesium halide and a halogen containing titanium compound-electron donor complex are first mixed and pulverized together. Then, a liquid aromatic hydrocarbon and/or a liquid aromatic hydrocarbon halide is added to the mixture and is pulverized together therewith.

(4) A process in which an anhydrous magnesium halide is thoroughly suspended in a liquid aromatic hydrocarbon and/or a liquid aromatic hydrocarbon halide and then is filtrated. Then, a cake which is thus obtained is mixed and pulverized together with a halogen containing titanium compound-electron donor complex.

(5) A process in which an anhydrous magnesium halide, a liquid aromatic hydrocarbon and/or a liquid aromatic hydrocarbon halide are pulverized together. Then, a halogen containing titanium compound-electron donor complex is added to this pulverized mixture and is pulverized therewith.

(6) A process in which a liquid aromatic hydrocarbon and/or a liquid aromatic hydrocarbon halide and a halogen containing titanium compound-electron donor complex are brought into contact with each other or pulverized together. Then an anhydrous magnesium halide is added to the mixture to the mixture and is pulverized together therewith.

(7) A process in which, in the above stated processes (2), (3), (4), (5) and (6), a halogen containing titanium compound and an electron donor are used in combination with each other in place of the halogen containing titanium compound-electron donor complex.

(8) A process in which, in the above processes (1), (2), (3), (4), (5), (6) and (7), a halogen concentration diluent is added at an arbitrarily chosen moment and is pulverized with the mixture.

In accordance with this invention, the supported catalytic component is prepared at a temperature within a range from 0° to 100° C. and preferably within a range from normal temperature to 80° C. If the temperature is below the normal temperature and particularly below 0° C., a long period of time is required for pulverization and, in addition to that, the pulverizer must be cooled. However, since cooling efficiency for a pulverizer is calocimetrically poor, this impairs the economical merit of the process. On the other hand, pulverization at a temperature above 80° C. and particularly at a temperature exceeding 100° C., a desired catalytic efficiency often can hardly be obtained. However, it must be noted that the pulverization process must be carried out at a temperature which is above the melting point and below the boiling point of the liquid aromatic hydrocarbon and the liquid aromatic hydrocarbon halide employed in the preparation of the supported catalytic component. Although the length of time of pulverization for each component may be arbitrarily determined, the pulverization should be normally carried out until the specific surface area of the carrier catalytic component becomes 3 m$^2$/g, or, in an X-ray powder spectrum, until the strongest diffraction ray of the X ray powder spectrum of a normal inert anhydrous magnesium halide is expanded several times.

The supported catalytic component which is prepared in the manner as described in the foregoing forms an α-olefin polymerizing catalyst system, in the concomitant presence of an electron donor, in combination with an organoaluminum compound which can be expressed by a generic formula of AlRnX$_{3-n}$ ($0 < n \leq 3$: R represents a hydrocarbon residue and X halogen). The organoaluminum compound can be selected out of the group consisting of triethyl aluminum, diethyl aluminum chloride, ethyl aluminum dichloride, ethyl aluminum sesquichloride, triisobutyl aluminum, diisobutyl aluminum chloride, etc. Of these compounds, the use of triethyl aluminumis particularly preferable. The addition quantity of the organoaluminum, an converted into the Al atoms contained in the organoaluminum compound per Ti atom contained in the supported catalytic component, is preferably 10 to 1000 in the Al/Ti molar ratio. As for the electron donor, the compounds which have been mentioned in the foregoing as materials for the preparation of the supported catalytic component are also usable for the α-olefin polymerizing catalyst system. Of these compounds, ethyl p-anisate is particularly useful. The quantity of the electron donor to be used is most preferably in the ratio of 0.05–0.5 mol to 1 mol of alkyl aluminum.

The polymerization process may be selected from the following various processes: A suspension polymerization process in which an inert hydrocarbon selected out of aromatic hydrocarbons such as benzene, toluene, xylene, etc., aliphatic hydrocarbons such as heptane, hexane, octane, etc. and alicyclic hydrocarbons such as cyclohexane, cycloheptane is employed as solvent; a liquid phase polymerization process in which a liquefied monomer is employed as solvent; and a gas phase polymerization process in which polymerization may be carried out either in a batch process or in a continuous process.

The polymerization temperature is within a range of 0°–200° C. and is preferably 40°–100° C. The polymerization pressure is within a range from a normal pressure to 100 atms. However, it is preferable to carry out polymerization under pressure between normal pressure and 50 atms.

The α-olefin that can be polymerized with the supported catalytic component of this invention includes compounds having the structure of $CH_2=CHR$, where P represents hydrogen or a hydrocarbon residue which has 1 to 6 carbon atoms, such as ethylene, propylene, butene-1, 4-methyl pentene-1, hexene-1, styrene, etc. The α-olefins not only can be polymerized alone but also can be copolymerized. Molecular weight adjustment may be carried out by using hydrogen or diethyl zinc in accordance with known conventional methods.

DETAILED DESCRIPTION OF THE PREFERRED EMBODIMENTS

The present invention will be more clearly understood from the following detailed description of examples. However, these examples are intended to illustrate the invention and are not to be construed to limit the scope of the invention.

In the following examples, the terms "polymerization activity P", "heptane insoluble HI" and "bulk density d" respectively mean:

P: The weight of α-olefin polymer per gram of the titanium contained in the supported catalytic component (unit: g-p.p/g-Ti)

HI: The ratio by weight of polyolefin which is insoluble in boiling n-heptane to the whole solid polyolefin product obtained, (unit: %), i.e.:

$$\frac{\text{weight of boiling n-heptane insoluble polymer}}{\text{weight of polymer product obtained}} \times 100$$

d: The bulk density of the polymer measured by the Method A of ASTM D-1895-69, (unit: g/ml)

EXAMPLE 1

Process for Preparation of the Carrier Catalytic Component:

First, 200 g of a commercially available anhydrous magnesium chloride was dried at 200° C. The dried anhydrous magnesium chloride was put in nitrogen atmosphere in a ball mill the inside of which had been replaced with nitrogen beforehand and which measured 150 mm in diameter and 2.5 liters in content volume, the ball mill being filled with 4.5 kg of stainless steel balls measuring 25.4 mm in diameter. The anhydrous magnesium chloride was pulverized at a rotational frequency of 125 r.p.m. and at room temperature for a period of 50 hours to obtain an activated anhydrous magnesium chloride. On the other hand, 1000 ml of n-hexane which had been dehydrated and degased and 160 ml of titanium tetrachloride was introduced in a dry nitrogen atmosphere into a two-necked 2 liter flask which was made of glass and the inside of which had been replaced with dry nitrogen beforehand. Stirring was started with this container sealed with the dry nitrogen inside thereof. Following this, 195 ml of ethyl benzoate was gradually added. After addition of the ethyl benzoate, the liquid inside the flask was heated up to 60° C. and stirring was further continued for one hour with the liquid temperature kept at 60° C. As a result of this a titanium tetrachloride-ethyl benzoate complex came to precipitate. Then, the reaction liquid was filtrated to obtain a cake. The cake which was thus obtained was thoroughly washed with n-hexane. The washed cake was dried under reduced pressure to obtain yellow crystals of the titanium tetrachloride-ethyl benzoate complex.

Another ball mill which measures 150 mm in diameter and 2.5 liters in content volume and which had been filled with 5.4 kg of stainless steel balls measuring 25.4 mm in diameter had been prepared with its inside replaced with dry nitrogen. Then, 82 g of the activated anhydrous magnesium chloride which had been prepared in the above stated manner, 24 g of the above stated titanium tetrachloride-ethyl benzoate complex and, in addition to them, 5.08 g of styrene which was employed as liquid aromatic hydrocarbon were put in the ball mill in a dry nitrogen atmosphere. They were thus pulverized together at a rotational frequency of 125 r.p.m. at room temperature for 24 hours to obtain a supported catalytic component. The supported catalytic component contained 3.04 weight % of Ti.

Polymerizing Method

The inside of a 2 liter autoclave was replaced with dry nitrogen beforehand. Then, 50 ml of n-heptane, 0.394 ml of triethyl aluminum and 0.110 ml of ethyl p-anisate were added inside the autoclave. Following this, 0.04 g of the supported catalytic component was placed in the autoclave. The inside of the autoclave was heated up to 80° C. and then 250 ml of hydrogen and 550 g of liquid propylene were introduced into the autoclave. Stirring was carried out by allowing a stirrer to rotate at 400 r.p.m. while the inside temperature of the autoclave was kept at 80° C.

Polymerization was considered to begin when the liquid propylene was introduced and stirring was stopped two hours after the commencement of polymerization. Then, non-reacted propylene was purged out.

In this manner, 304 g of polypropylene was obtained. The polypropylene was then subjected to an extraction process which was carried out using a Soxhlet's extractor with boiling n-heptane for a period of 20 hours. The results of the extraction process were:
P: 250,000
HI: 92.1
d: 0.354

COMPARISON EXAMPLE 1

With the exception of that the styrene which was employed as liquid aromatic hydrocarbon in Example 1 was not used, the preparation of a supported catalytic component and the polymerization of propylene were carried out in the same manner as in Example 1. The results of this experiment were:

The Ti content in the supported catalytic component: 3.09 wt%
  P: 126,000
  HI: 86.6
  d: 0.315

COMPARISON EXAMPLE 2

The preparation of a supported catalytic component and the polymerization of propylene were carried out in the same manner as in Example 1 except that a solid aromatic hydrocarbon durene was employed in place of the liquid aromatic hydrocarbon styrene which was employed in Example 1. The results of this experiment were as shown below:

Ti content in the supported catalytic component: 3.10 wt%
  P: 120,000
  HI: 92.1
  d: 0.308

COMPARISON EXAMPLE 3

A supported catalytic component was prepared and polymerization of propylene was carried out in exactly the same manner as in Comparison Example 2 except that naphthaline which was also a solid aromatic hydrocarbon like durene was employed in place of durene which was employed in Comparison Example 2. The results were as shown below:

Ti content in the supported catalytic component: 2.98 wt%
  P: 115,000
  HI: 91.8
  d: 0.320

EXAMPLES 2-10

In Example 1, 5.08 g of styrene was employed as liquid aromatic hydrocarbon. In Examples 2 through 10, however, various kinds of liquid aromatic hydrocarbon and various liquid aromatic hydrocarbon halides were employed in quantity (parts by wt) as shown in Table 1 in place of the styrene. With the exception of this, the preparation of the supported catalytic component and the polymerization of propylene were carried out in exactly the same manner as in Example 1. The results of the experiments were as shown in Table 1.

EXAMPLES 11-14

In place of 24 g of the titanium tetrachloride-ethyl benzoate complex which was employed as halogen containing titanium compound-electron donor complex in Example 1, different kinds of complexes were employed in quantity (parts by weight) as shown in Table 2. With the exception of this, the preparation of the supported catalytic component and the polymerization of propylene were carried out in exactly the same manner as in Example 1. The results of these experiments were as shown in Table 2.

EXAMPLES 15-19

With the exception of that different kinds of halogen containing titanium compounds and different kinds of electron donors were separately added in quantity (parts by weight) as shown in Table 3 in place of the halogen containing titanium compound-electron donor complex which was used in Example 1, the experiments of Examples 15-19 were carried out in exactly the same manner as in Example 1 to obtain the results as shown in Table 3.

EXAMPLES 20-23

In the case of Example 1, an activated anhydrous magnesium chloride, a titanium tetrachloride-ethyl benzoate complex and styrene were mixed and pulverized together. However, in Examples 20-23, the co-pulverization was carried out after various kinds of halogen concentration diluents had been added and mixed as shown in Table 4. With the exception of this, the preparation of the catalytic component and the polymerization of propylene were carried out in exactly the same manner as in Example 1 to obtain the results as shown in Table 4.

EXAMPLES 24-38

In Example 1, 5.6 ml of styrene was employed as liquid aromatic hydrocarbon. In the cases of Examples 24-38, however, styrene, benzene and chlorobenzene are selected as liquid aromatic hydrocarbon and liquid aromatic hydrocarbon halide and were used individually in quantity as shown in Table 5. With the exception of this, the preparation of the supported catalytic component and the polymerization of propylene were carried out in exactly the same manner as in Example 1 to obtain the results as shown in Table 5.

EXAMPLE 39

An activated anhydrous magnesium chloride was prepared in the same manner as in Example 1. Then, 82 g of the activated anhydrous magnesium chloride and 24 g of a titanium tetrachloride-ethyl benzoate complex and 5.6 ml of styrene which was employed as liquid aromatic hydrocarbon were put in a nitrogen atmosphere in vibration mill the inside of which had been replaced with dry nitrogen beforehand. The vibration mill measures 109 mm in diameter and 1.2 liter in content volume and was filled with 5.4 kg of stainless steel balls measuring 25.4 mm in diameter. With this vibration mill, co-pulverization was carried out at room temperature for 6 hours to obtain a supported catalytic component, the Ti content of which was 3.03 % by weight.

Using the supported catalytic component which was prepared in the above stated manner, polymerization was carried out in exactly the same manner as in Example 1 to obtain the following results:
  P: 241,000
  HI: 92.1
  d: 0.352

EXAMPLES 40-43

While the co-pulverization was carried out at room temperature in Example 39, the co-pulverization was carried out at different temperatures in Examples 40-43 as shown in Table 6. With the exception of this, the preparation of the supported catalytic component and the polymerization of propylene were carried out in exactly the same manner as in Example 1 to obtain the results as shown in Table 6.

COMPARISON EXAMPLES 4–9

While 5.08 g of styrene was employed as liquid aromatic hydrocarbon in Example 1, in these Comparison Examples 4–9, styrene, benzene and chlorobenzene were selected as liquid aromatic hydrocarbon and liquid aromatic hydrocarbon halide and were used in quantity, outside of the prescribed range of the invention, as shown in Table 7. With the exception of this, the preparation of the supported catalytic component and the polymerization of propylene were carried out in exactly the same manner as in Example 1 to obtain the results as shown in Table 7.

COMPARISON EXAMPLES 10–11

In example 39, co-pulverization was carried out at room temperature. In Comparison Examples 10 and 11, however, the co-pulverization was carried out at temperature which was outside of the prescribed temperature range as shown in Table 8. With the exception of this, the preparation of the supported catalytic component and the polymerization of propylene were carried out in exactly the same manner as in Example 39 to obtain results as shown in Table 8.

EXAMPLE 44

Using a vibration mill which measures 109 mm in diameter and 1.2 liter in content volume and which had been prepared by replacing its inside with dry nitrogen beforehand and by filling it with 5.4 kg of stainless steel balls of 25.4 mm diameter, 92 g of an activated anhydrous magnesium chloride which was obtained in the same manner as in Example 1, 7.6 ml of titanium tetrachloride and 5.2 g of styrene were placed in the vibration mill in a dry nitrogen atmosphere. They were pulverized together at normal temperature for 4 hours to obtain a supported catalyst component, the Ti content of which was 3.02 wt. %. With this supported catalytic component used, the polymerization of propylene was carried out to obtain polypropylene. The weight of the obtained polypropylene was 258 g: p: 214,000: and HI: 94.7

EXAMPLE 45

Using a vibration mill which measures 109 mm in diameter and 1.2 liter in content volume and which had been prepared by replacing its inside with dry nitrogen beforehand and by filling it with 5.4 kg of stainless steel balls of 25.4 mm diameter, 82 g of an activated anhydrous magnesium chloride which was obtained in the same manner as in Example 1 and 24 g of a titanium tetrachloride-ethyl benzoate complex were placed in the vibration mill in a dry nitrogen atmosphere. They were pulverized together inside the vibration mill at normal temperature for 6 hours. After this, 5.2 g of styrene was introduced into the vibration mill in a dry nitrogen atmosphere. Then, co-pulverization was carried out at the normal temperature for 4 hours to obtain a supported catalytic component. The Ti content of the supported catalytic component was 3.04% by weight. The polymerization of propylene was carried out by using this supported catalytic component. The results of the polymerization were:
P: 204,000
HI: 91.7%

EXAMPLE 46

An activated anhydrous magnesium chloride was first obtained in the same manner as in Example 1. Then, 82 g of it was suspended in a nitrogen atmosphere in 1000 ml of benzene which had been dehydrated. After suspension for 24 hours, the suspension liquid was filtrated. A cake which was obtained by filtration and 24 g of a titanium tetrachloride-ethyl benzoate complex which was obtained in the same manner as in Example 1 were placed in a nitrogen atmosphere in a vibration mill the inside of which had been replaced with dry nitrogen beforehand. The vibration mill measures 109 mm in diameter and 1.2 liter in content volume and was filled with 5.4 kg of stainless steel balls of 25.4 mm diameter. With this vibration mill used, co-pulverization was carried out at a normal temperature for 6 hours to obtain a supported catalytic component. The Ti content of the supported catalytic component was 3.07 wt. %. Then, polymerization of propylene was carried out by using this supported catalytic component in exactly the same manner as in Example 1. The results of the polymerization were:
P: 231,000
HI: 90.6

EXAMPLE 47

Using a vibration mill which measures 109 mm in diameter and 1.2 liter in content volume and was filled with 5.4 kg of stainless steel balls of 25.4 mm diameter and the inside of which had been replaced with dry nitrogen beforehand, 82 g of an activated anhydrous magnesium chloride which was obtained in the same manner as in Example 1 and 24 g of monochlorobenzene were placed in a nitrogen atmosphere in the vibration mill and were pulverized together therein at a normal temperature for 4 hours. Following this, 24 g of a titanium tetrachloride-ethyl benzoate complex which was prepared in the same manner as in Example 1 was mixed in the nitrogen atmosphere and was also pulverized together with others for 3 hours to obtain a supported catalytic component. The Ti content of the supported catalytic component was 3.11 wt. %. Polymerization of propylene was carried out by using this supported catalytic component in exactly the same manner as in Example 1. The results were:
P: 229,000
HI: 89.8

EXAMPLE 48

First, 24 g of a titanium tetrachloride-ethyl benzoate complex which was prepared in the same manner as in Example 1 was thoroughly washed with styrene. Then, the complex had 82 g of an activated anhydrous magnesium chloride which was prepared in the same manner as in Example 1 were placed in a nitrogen atmosphere a vibration mill which measured 109 mm in diameter and 1.2 liter in content volume and which was filled with 5.4 kg of stainless steel balls of 25.4 mm diameter. With this vibration mill used, co-pulverization was carried out at room temperature for 6 hours to obtain a supported catalytic component. The Ti content of the supported catalytic component was 3.00 wt %. Using this supported catalytic component, polymerization of propylene was carried out in exactly the same manner as in Example 1. The results of the polymerization were:
P: 210,000
HI: 90.8

EXAMPLE 49

While a commercially available anhydrous magnesium chloride was used in Example 1, a commercially available anhydrous magnesium bromide was employed in Example 49. With the exception of this, a supported catalytic component was prepared in exactly the same manner as in Example 1. Then, by using this supported catalytic component, polymerization of propylene was carried out also in exactly the same manner as in Example 1 to obtain the following results:
P: 158,000
HI: 88.8

EXAMPLE 50

The use of the commercially available anhydrous magnesium chloride which was employed in Example 1 was replaced with the use of a commercially available anhydrous magnesium iodide in Example 50. With the exception of this, the preparation of a supported catalytic component and the polymerization of propylene were carried out in exactly the same manner as in Example 1 to obtain the following results:
P: 156,000
HI: 89.3

EXAMPLE 51

An activated anhydrous magnesium chloride was prepared by heating under reduced pressure 700 ml of a methanol solution in which 100 g of a commercially available anhydrous magnesium chloride was dissolved. The heating was carried out until the methanol was completely evaporated.

Then, using this activated anhydrous magnesium chloride, a supported catalytic component was prepared and the polymerization of propylene was carried out in exactly the same manner as in Example 1 to obtain the following results:
P: 246,000
HI: 91.4

EXAMPLE 52

The inside of a stainless steel autoclave of 2 liter content volume was replaced with dry nitrogen. Then, the autoclave was filled with 0.04 g of the supported catalytic component which was prepared in the same manner as in Example 1, 0.394 ml of triethyl aluminum, 0.110 ml of ethyl p-anisate and 1000 ml of dry n-heptane in a dry nitrogen atmosphere. Following this, 5 m.mol of hydrogen gas was introduced into the autoclave. The autoclave was then heated until the inside temperature thereof reached 70° C. Then, while the inside temperature and the inside pressure of the autoclave were respectively kept at 70° C. and 10 kg/cm$^2$G, propylene was put therein with pressure to carry out polymerization for 4 hours. Upon completion of the polymerization reaction, a propylene gas which existed within the autoclave was purged out therefrom and the catalytic components were decomposed by injecting 100 ml of methanol into the autoclave. The suspension of the polypropylene which had been produced through the polymerization reaction was filtrated to obtain a cake. The cake was washed with a mixture solution consisting of isopropanol and methanol in a volume ratio 1:3. Following this, a dried solid polymer was obtained through a drying process carried out under reduced pressure. The dry solid polymer was subjected to an extraction process carried out by a Soxhlet's extractor for 24 hours with boiling n-heptane to separate a n-heptane insoluble polymer from a soluble polymer. The results of this experiment were as follows:
P: 242,000
HI: 91.4

EXAMPLE 53

Using the supported catalytic component prepared in accordance with the procedure described in Example 1, co-polymerization of ethylene and propylene was carried out in the following manner: 0.04 g of the supported catalytic component, 0.394 ml of triethyl aluminum, 0.110 ml of ethyl p-anisate and 1000 ml of dried n-heptane were placed in a dry nitrogen gas atmosphere in a stainless steel autoclave of 2 liter content volume. The inside of the autoclave had been replaced with dry nitrogen gas beforehand. Further, 5 m.mol of hydrogen gas was introduced into the autoclave. After that, the autoclave was heated until the inside temperature thereof reached 70° C. Then, while the inside temperature and the inside pressure of the autoclave were kept respectively at 70° C. and 3 kg/cm$^2$, a mixture gas consisting of ethylene and propylene (ethylene content is 5 mol %) was introduced and co-polymerization was carried out for 4 hours. The supply of the mixture gas was stopped and the mixture gas remaining in the autoclave was purged away to the outside of the reaction system.

A solid product which was obtained in this manner is analyzed by an infrared absorption spectrum to find that it contained 3.4% by weight of ethylene therein. Further, the quantity of the copolymer formed was found to be 274,000 g per gram of the titanium contained in the supported catalytic component.

TABLE 1

| Example No. | Q'ty of activated anhydrous magnesium chloride (wt part) | Halogen containing titanium compound and electron donor or a complex consisting of them | | Aromatic hydrocarbon and aromatic hydrocarbon halide | | Halogen concentration diluent | | Pulverizing conditions | | Ti content of the catalytic component (wt %) | Polymer | |
|---|---|---|---|---|---|---|---|---|---|---|---|---|
| | | Chemical formula | Q'ty (wt part) | Nomenclature | Q'ty (wt part) | Nomenclature | Q'ty (wt part) | Temp. (°C.) | Time (hr) | | P (g-pp/g-Ti) | HI (%) |
| 1 | 100 | TiCl$_4$—C$_6$H$_5$CO$_2$C$_2$H$_5$ | 29.3 | Styrene | 4.57 | — | — | Room temp. | 24 | 3.04 | 250,000 | 92.1 |
| 2 | 100 | TiCl$_4$—C$_6$H$_5$CO$_2$C$_2$H$_5$ | 29.3 | Benzene | 6.20 | — | — | Room temp. | 24 | 3.08 | 214,000 | 90.2 |
| 3 | 100 | TiCl$_4$—C$_6$H$_5$CO$_2$C$_2$H$_5$ | 29.3 | Toluene | 6.20 | — | — | Room temp. | 24 | 2.98 | 203,000 | 90.4 |

TABLE 1-continued

| Example No. | Q'ty of activated anhydrous magnesium chloride (wt part) | Halogen containing titanium compound and electron donor or a complex consisting of them | | Aromatic hydrocarbon and aromatic hydrocarbon halide | | Halogen concentration diluent | | Pulverizing conditions | | Ti content of the catalytic component (wt %) | Polymer | |
|---|---|---|---|---|---|---|---|---|---|---|---|---|
| | | Chemical formula | Q'ty (wt part) | Nomenclature | Q'ty (wt part) | Nomenclature | Q'ty (wt part) | Temp. (°C.) | Time (hr) | | P (g-pp/g-Ti) | HI (%) |
| 4 | 100 | $TiCl_4$—$C_6H_5CO_2C_2H_5$ | 29.3 | Chlorobenzene | 6.20 | — | — | Room temp. | 24 | 3.00 | 213,000 | 90.8 |
| 5 | 100 | $TiCl_4$—$C_6H_5CO_2C_2H_5$ | 29.3 | Bromobenzene | 6.20 | — | — | Room temp. | 24 | 2.99 | 193,000 | 90.1 |
| 6 | 100 | $TiCl_4$—$C_6H_5CO_2C_2H_5$ | 29.3 | m-chlorotoluene | 6.20 | — | — | Room temp. | 24 | 3.05 | 188,000 | 91.5 |
| 7 | 100 | $TiCl_4$—$C_6H_5CO_2C_2H_5$ | 29.3 | p-xylene | 6.20 | — | — | Room temp. | 24 | 3.39 | 239,000 | 91.9 |
| 8 | 100 | $TiCl_4$—$C_6H_5CO_2C_2H_5$ | 29.3 | Styrene Benzene | 3.10 3.10 | — | — | Room temp. | 24 | 3.15 | 186,000 | 90.8 |
| 9 | 100 | $TiCl_4$—$C_6H_5CO_2C_2H_5$ | 29.3 | Benzene Chlorobenzene | 3.10 3.10 | — | — | Room temp. | 24 | 3.10 | 216,000 | 90.7 |
| 10 | 100 | $TiCl_4$—$C_6H_5CO_2C_2H_5$ | 29.3 | Styrene Toluene | 3.10 3.10 | — | — | Room temp. | 24 | 3.03 | 210,000 | 90.9 |

TABLE 2

| Example No. | Q'ty of activated anhydrous magnesium chloride (wt part) | Halogen containing titanium compound and electron donor or a complex consisting of them | | Aromatic hydrocarbon and aromatic hydrocarbon halide | | Halogen concentration diluent | | Pulverizing conditions | | Ti content of the catalytic component (wt %) | Polymer | |
|---|---|---|---|---|---|---|---|---|---|---|---|---|
| | | Chemical formula | Q'ty (wt part) | Nomenclature | Q'ty (wt part) | Nomenclature | Q'ty (wt part) | Temp. (°C.) | Time (hr) | | P (g-pp/g-Ti) | HI (%) |
| 11 | 100 | $TiCl_4$—$C_6H_5CO_2C_3H_5$ | 29.3 | Styrene | 6.2 | — | — | Room temp. | 24 | 2.98 | 205,000 | 89.1 |
| 12 | 100 | $TiCl_4$—$C_2H_5COCH_3$ | 29.3 | Styrene | 6.2 | — | — | Room temp. | 24 | 3.17 | 212,000 | 89.7 |
| 13 | 100 | $TiCl_4$—$C_4H_9OC_4H_9$ | 29.3 | Styrene | 6.2 | — | — | Room temp. | 24 | 3.13 | 196,000 | 91.2 |
| 14 | 100 | $TiCl_4$—$C_6H_5CO_2C_2H_5$ | 29.3 | Styrene | 6.2 | — | — | Room temp. | 24 | 3.06 | 215,000 | 93.2 |

TABLE 3

| Example No. | Q'ty of activated anhydrous magnesium chloride (wt part) | Halogen containing titanium compound and electron donor or a complex consisting of them | | Aromatic hydrocarbon and aromatic hydrocarbon halide | | Halogen concentration diluent | | Pulverizing conditions | | Ti content of the catalytic component (wt %) | Polymer | |
|---|---|---|---|---|---|---|---|---|---|---|---|---|
| | | Chemical formula | Q'ty (wt part) | Nomenclature | Q'ty (wt part) | Nomenclature | Q'ty (wt part) | Temp. (°C.) | Time (hr) | | P (g-pp/g-Ti) | HI (%) |
| 15 | 100 | $TiCl_4$ $C_6H_5CO_2C_2H_5$ | 16.4 12.9 | Styrene | 6.2 | — | — | Room temp. | 24 | 3.09 | 228,000 | 91.5 |
| 16 | 100 | $TiCl_4$ $C_6H_5CO_2C_3H_7$ | 13.8 15.5 | Styrene | 6.2 | — | — | Room temp. | 24 | 2.56 | 216,000 | 89.6 |
| 17 | 100 | $TiCl_4$ $C_2H_5COCH_3$ | 22.1 7.3 | Styrene | 6.2 | — | — | Room temp. | 24 | 4.10 | 171,000 | 92.0 |
| 18 | 100 | $TiCl_4$ $C_4H_9OC_4H_9$ | 17.4 11.9 | Styrene | 6.2 | — | — | Room temp. | 24 | 3.21 | 200,000 | 91.6 |
| 19 | 100 | $TiCl_3$ $C_6H_5COOC_2H_5$ | 15.4 13.9 | Styrene | 6.2 | — | — | Room temp. | 24 | 2.85 | 227,000 | 90.5 |

TABLE 4

| Example No. | Q'ty of activated anhydrous magnesium chloride (wt part) | Halogen containing titanium compound and electron donor or a complex consisting of them Chemical formula | Q'ty (wt part) | Aromatic hydrocarbon and aromatic hydrocarbon halide Nomenclature | Q'ty (wt part) | Halogen concentration diluent Nomenclature | Q'ty (wt part) | Pulverizing conditions Temp. (°C.) | Time (hr) | Ti content of the catalytic component (wt %) | Polymer P (g-pp/g-Ti) | HI (%) |
|---|---|---|---|---|---|---|---|---|---|---|---|---|
| 20 | 100 | $TiCl_4$—$C_6H_5CO_2C_2H_5$ | 29.3 | Benzene | 6.2 | Boron oxide | 50 | Room temp. | 24 | 1.63 | 212,000 | 93.5 |
| 21 | 100 | $TiCl_4$—$C_6H_5CO_2C_2H_5$ | 29.3 | Benzene | 6.2 | Alumina | 50 | Room temp. | 24 | 1.52 | 216,000 | 92.1 |
| 22 | 100 | $TiCl_4$—$C_6H_5CO_2C_2H_5$ | 29.3 | Benzene | 6.2 | Naphthaline | 30 | Room temp. | 24 | 2.09 | 210,000 | 80.9 |
| 23 | 100 | $TiCl_4$—$C_6H_5CO_2C_2H_5$ | 29.3 | Benzene | 6.2 | Durene | 70 | Room temp. | 24 | 1.02 | 214,000 | 92.9 |

TABLE 5

| Example No. | Q'ty of activated anhydrous magnesium chloride (wt part) | Halogen containing titanium compound and electron donor or a complex consisting of them Chemical formula | Q'ty (wt part) | Aromatic hydrocarbon and aromatic hydrocarbon halide Nomenclature | Q'ty (wt part) | Halogen concentration diluent Nomenclature | Q'ty (wt part) | Pulverizing conditions Temp. (°C.) | Time (hr) | Ti content of the catalytic component (wt %) | Polymer P (g-pp/g-Ti) | HI (%) |
|---|---|---|---|---|---|---|---|---|---|---|---|---|
| 24 | 100 | $TiCl_4$—$C_6H_5CO_2C_2H_5$ | 29.3 | Styrene | 0.13 | — | — | Room temp. | 24 | 3.18 | 180,000 | 88.9 |
| 25 | 100 | $TiCl_4$—$C_6H_5CO_2C_2H_5$ | 29.3 | Styrene | 1.29 | — | — | Room temp. | 24 | 3.15 | 229,000 | 93.1 |
| 26 | 100 | $TiCl_4$—$C_6H_5CO_2C_2H_5$ | 29.3 | Styrene | 3.10 | — | — | Room temp. | 24 | 3.11 | 263,000 | 93.2 |
| 27 | 100 | $TiCl_4$—$C_6H_5CO_2C_2H_5$ | 29.3 | Styrene | 12.9 | — | — | Room temp. | 24 | 2.90 | 208,000 | 91.1 |
| 28 | 100 | $TiCl_4$—$C_6H_5CO_2C_2H_5$ | 29.3 | Styrene | 19.4 | — | — | Room temp. | 24 | 2.84 | 183,000 | 87.9 |
| 29 | 100 | $TiCl_4$—$C_6H_5CO_2C_2H_5$ | 29.3 | Benzene | 0.13 | — | — | Room temp. | 24 | 3.19 | 166,000 | 85.6 |
| 30 | 100 | $TiCl_4$—$C_6H_5CO_2C_2H_5$ | 29.3 | Benzene | 1.29 | — | — | Room temp. | 24 | 3.17 | 184,000 | 89.9 |
| 31 | 100 | $TiCl_4$—$C_6H_5CO_2C_2H_5$ | 29.3 | Benzene | 3.01 | — | — | Room temp. | 24 | 3.08 | 229,000 | 90.6 |
| 32 | 100 | $TiCl_4$—$C_6H_5CO_2C_2H_5$ | 29.3 | Benzene | 12.9 | — | — | Room temp. | 24 | 2.89 | 201,000 | 91.8 |
| 33 | 100 | $TiCl_4$—$C_6H_5CO_2C_2H_5$ | 29.3 | Benzene | 19.4 | — | — | Room temp. | 24 | 2.75 | 180,000 | 90.0 |
| 34 | 100 | $TiCl_4$—$C_6H_5CO_2C_2H_5$ | 29.3 | Chlorobenzene | 0.13 | — | — | Room temp. | 24 | 3.16 | 149,000 | 86.3 |
| 35 | 100 | $TiCl_4$—$C_6H_5CO_2C_2H_5$ | 29.3 | Chlorobenzene | 1.29 | — | — | Room temp. | 24 | 3.14 | 167,000 | 88.8 |
| 36 | 100 | $TiCl_4$—$C_6H_5CO_2C_2H_5$ | 29.3 | Chlorobenzene | 3.01 | — | — | Room temp. | 24 | 3.07 | 226,000 | 91.4 |
| 37 | 100 | $TiCl_4$—$C_6H_5CO_2C_2H_5$ | 29.3 | Chlorobenzene | 12.9 | — | — | Room temp. | 24 | 2.88 | 184,000 | 90.2 |
| 38 | 100 | $TiCl_4$—$C_6H_5CO_2C_2H_5$ | 29.3 | Chlorobenzene | 19.4 | — | — | Room temp. | 24 | 2.92 | 198,000 | 90.6 |

TABLE 6

| Example No. | Q'ty of activated anhydrous magnesium chloride (wt part) | Halogen containing titanium compound and electron donor or a complex consisting of them - chemical formula | Q'ty (wt part) | Aromatic hydrocarbon and a aromatic hydrocarbon halide - Nomenclature | Q'ty (wt part) | Halogen concentration diluent - Nomenclature | Q'ty (wt part) | Pulverizing conditions Temp. (°C.) | Time (hr) | Ti content of the catalytic component (wt %) | Polymer P (g-pp/g-Ti) | HI (%) |
|---|---|---|---|---|---|---|---|---|---|---|---|---|
| 40 | 100 | $TiCl_4$—$C_6H_5CO_2C_2H_5$ | 29.3 | Chlorobenzene | 6.2 | — | — | 40 | 5 | 3.10 | 223,000 | 91.1 |
| 41 | 100 | $TiCl_4$—$C_6H_5CO_2C_2H_5$ | 29.3 | Chlorobenzene | 6.2 | — | — | 60 | 5 | 3.04 | 209,000 | 90.9 |
| 42 | 100 | $TiCl_4$—$C_6H_5CO_2C_2H_5$ | 29.3 | Chlorobenzene | 6.2 | — | — | 80 | 5 | 3.02 | 189,000 | 88.3 |
| 43 | 100 | $TiCl_4$—$C_6H_5CO_2C_2H_5$ | 29.3 | Chlorobenzene | 6.2 | — | — | 100 | 5 | 3.02 | 172,000 | 85.1 |

TABLE 7

| Comparison example No. | Q'ty of activated anhydrous magnesium chloride (wt part) | Halogen containing titanium compound and electron donor or a complex consisting of them - Chemical formula | Q'ty (wt part) | Aromatic hydrocarbon and aromatic hydrocarbon halide - Nomenclature | Q'ty (wt part) | Halogen concentration diluent - Nomenclature | Q'ty (wt part) | Pulverizing conditions Temp. (°C.) | Time (hr) | Ti content of the catalytic component (wt %) | Polymer P (g-pp/g-Ti) | HI (%) |
|---|---|---|---|---|---|---|---|---|---|---|---|---|
| 4 | 100 | $TiCl_4$—$C_6H_5CO_2C_2H_5$ | 29.3 | Styrene | 0.051 | — | — | Room temp. | 24 | 3.24 | 150,000 | 94.0 |
| 5 | 100 | $TiCl_4$—$C_6H_5CO_2C_2H_5$ | 29.3 | Styrene | 25.40 | — | — | Room temp. | 24 | 2.41 | 97,900 | 76.7 |
| 6 | 100 | $TiCl_4$—$C_6H_5CO_2C_2H_5$ | 29.3 | Benzene | 0.051 | — | — | Room temp. | 24 | 3.26 | 144,000 | 92.4 |
| 7 | 100 | $TiCl_4$—$C_6H_5CO_2C_2H_5$ | 29.3 | Benzene | 25.40 | — | — | Room temp. | 24 | 2.42 | 101,000 | 80.9 |
| 8 | 100 | $TiCl_4$—$C_6H_5CO_2C_2H_5$ | 29.3 | Chlorobenzene | 0.051 | — | — | Room temp. | 24 | 3.51 | 132,000 | 89.2 |
| 9 | 100 | $TiCl_4$—$C_6H_5CO_2C_2H_5$ | 29.3 | Chlorobenzene | 25.40 | — | — | Room temp. | 24 | 2.35 | 106,000 | 79.6 |

TABLE 8

| Comparison example No. | Q'ty of activated anhydrous magnesium chloride (wt part) | Halogen containing titanium compound and electron donor or a complex consisting of them - Chemical formula | Q'ty (wt part) | Aromatic hydrocarbon and aromatic hydrocarbon halide - Nomenclature | Q'ty (wt part) | Halogen concentration diluent - Nomenclature | Q'ty (wt part) | Pulverizing conditions Temp. (°C.) | Time (hr) | Ti content of the catalytic component (wt %) | Polymer P (g-pp/g-Ti) | HI (%) |
|---|---|---|---|---|---|---|---|---|---|---|---|---|
| 10 | 100 | $TiCl_4$—$C_6H_5CO_2C_2H_5$ | 29.3 | Styrene | 6.2 | — | — | 120 | 6 | 3.03 | 124,000 | 70.2 |
| 11 | 100 | $TiCl_4$—$C_6H_5CO_2C_2H_5$ | 29.3 | Chlorobenzene | 6.2 | — | — | 120 | 6 | 3.04 | 108,000 | 73.1 |

What is claimed is:

1. A high activity supported catalytic component which is prepared by pulverizing together an admixture of: (a) activated anhydrous magnesium chloride, the anhydrous magnesium chloride being activated by: (i) heating the anhydrous magnesium chloride to at least 100° C.; (ii) degassing the resulting heated anhydrous magnesium chloride under reduced pressure; and (iii) pulverising the degassed anhydrous magnesium chloride under an inert gas atmosphere; (b) 0.5 to 10 parts by weight of a titanium compound, reported as titanium, per 100 parts by weight of the activated anhydrous magnesium chloride, said titanium compound being a combination or complex of a halogen-containing tetravalent titanium compound and 0.1 to 200 moles of an ester per 100 moles of the halogen-containing tetravalent titanium compound; (c) 0.1 to 10 weight % of a liquid aromatic hydrocarbon and/or a liquid aromatic hydrocarbon halide based on the total weight of the magnesium chloride, the halogen-containing tetravalent titanium compound and the ester; and (d) 5 to 95 parts, per 100 parts by weight of said (a), (b) and (c), of a solid diluent selected from the group consisting of boron oxide, titanium oxide, aluminum oxide, silicon oxide and magnesium oxide; said pulverization being carried out at a temperature which is within the range of 0° to 25° C. and at which said liquid aromatic hydrocarbon and/or said liquid aromatic hydrocarbon halide remains in a liquid state throughout the whole range of temperature during said pulverization.

2. A method for homopolymerization of propylene or copolymerization of propylene and another $\alpha$-olefin comprising homo- or copolymerizing said propylene or propylene and other $\alpha$-olefin in the presence of a catalyst system comprising a high activity supported catalytic component, an organoaluminum compound having the formula $AlR_nX_{3-n}$ wherein $0<n\leq3$, R is a hydrocarbon moiety and X is halogen, and an electron donor; said high activity supported catalytic component being prepared by pulverizing together an admixture of: (a) an activated anhydrous magnesium chloride, the anhydrous magnesium chloride being activated by: (i) heating the anhydrous magnesium chloride to at least 100° C.; (ii) degassing the resulting heated anhydrous magnesium chloride under reduced pressure; and (iii) pulverizing the degassed anhydrous magnesium chloride under an inert gas atmosphere; (b) 0.5 to 10 parts by weight of a titanium compound, reported as titanium, per 100 parts by weight of the activated anhydrous magnesium chloride, said titanium compound being a combination or complex of a halogen-containing tetravalent titanium compound and 0.1 to 200 moles of an ester per 100 moles of the halogen-containing tetravalent titanium; (c) 0.1 to 10 weight % of a liquid aromatic hydrocarbon and/or a liquid aromatic hydrocarbon halide based on the total weight of the magnesium chloride, the halogen-containing tetravalent titanium compound and the ester; and (d) 5 to 95 parts, per 100 parts by weight of said (a), (b) and (c), of a solid diluent selected from the group consisting of boron oxide, titanium oxide, aluminum oxide, silicon oxide and magnesium oxide; said pulverization being carried out at a temperature which is within the range of 0° to 25° C. and at which said liquid aromatic hydrocarbon and/or said liquid aromatic hydrocarbon halide remains in a liquid state throughout the whole range of temperature during said pulverization.

3. The method of claim 2 in which the propylene or propylene and another $\alpha$-olefin is polymerized at 0°–200° C. and under a pressure of 1–100 atmospheres.

4. The method of claim 3 in which the other $\alpha$-olefin is selected from the group consisting of ethylene, butene-1, 4-methylpentene-1, hexene-1 and styrene.

* * * * *